United States Patent [19]
Lambert

[11] 3,765,241
[45] Oct. 16, 1973

[54] UNIVERSAL SENSING APPARATUS FOR SENSING VOLUMETRIC RATE OF FLUID FLOW

[76] Inventor: Robert R. Lambert, 442 W. Leadora, Glendale, Calif. 91740

[22] Filed: Feb. 11, 1971

[21] Appl. No.: 114,539

Related U.S. Application Data

[63] Continuation-in-part of Ser. Nos. 814,498, March 17, 1969, abandoned, and Ser. No. 706,058, Feb. 16, 1968, abandoned.

[52] U.S. Cl. .................................. 63/212, 73/3,
[51] Int. Cl. ...................................... G01n 9/00
[58] Field of Search............................ 73/212, 3, 432

[56] References Cited
UNITED STATES PATENTS

| 1,250,238 | 12/1917 | Spitzglass | 73/212 |
| 1,255,622 | 2/1918 | McFarland | 73/212 |

FOREIGN PATENTS OR APPLICATIONS

| 724,276 | 2/1955 | Great Britain | 73/212 |

Primary Examiner—Richard C. Queisser
Assistant Examiner—Arthur E. Korkosz
Attorney—Miketta, Glenny, Poms & Smith

[57] ABSTRACT

The sensing apparatus has two tubular members, each with a row of axially spaced side openings, a hollow threaded bushing extending from each end of each member, an end plate on either end of the tubular members, with the bushing extending through spaced holes in the end plates to rotatably mount the members thereto in spaced relationship with each other for being installed in a duct with one bushing of each tubular member extending through the wall of the duct to mount the sensing apparatus to the duct and to connect with means for measuring differential fluid pressure to sense the volumetric rate of air flow. The apparatus has mating dimples for indicating desired rotative positions of the axially spaced openings on the tubular members, a wrench slot in each bushing for receiving a wrench to rotate the bushing and the tubular member attached thereto, and axially spaced fins to provide smooth fluid flow over the tubular members. A template is provided with the apparatus for affixing to the wall of the duct to indicate the location to drill the holes for the bushings, and to provide a chart for converting differential fluid pressure into volumetric air flow.

11 Claims, 7 Drawing Figures

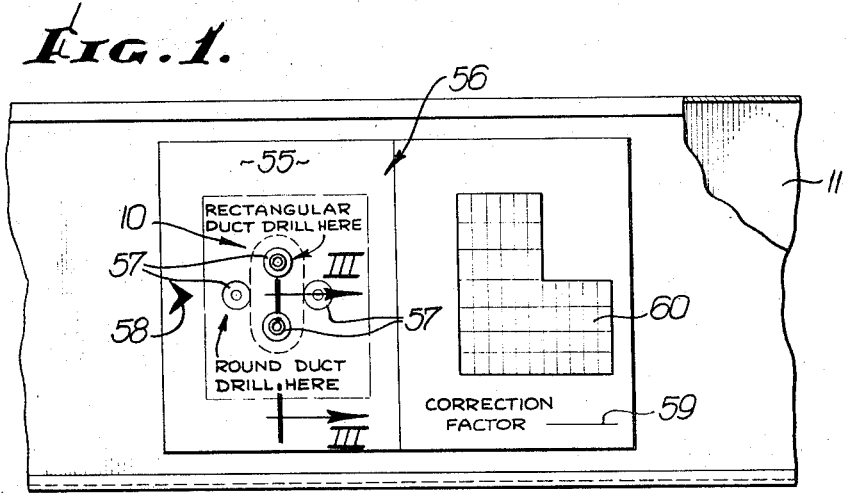
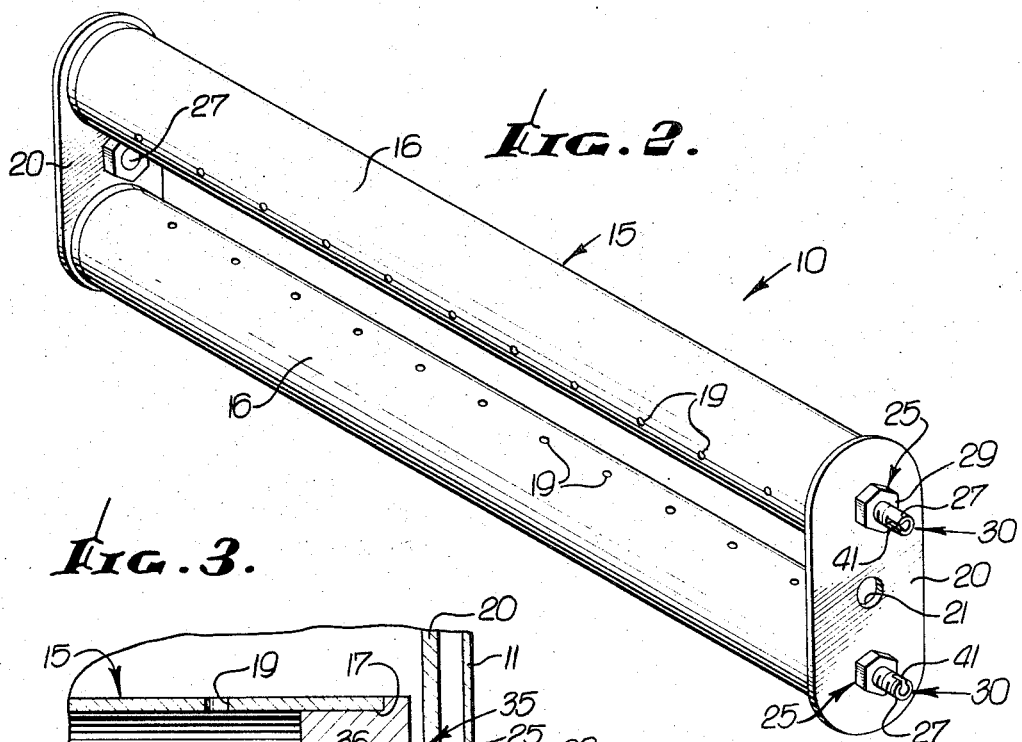

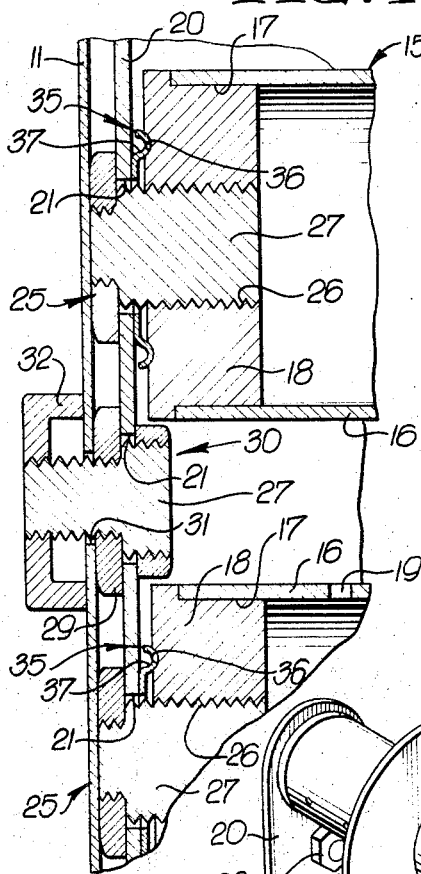
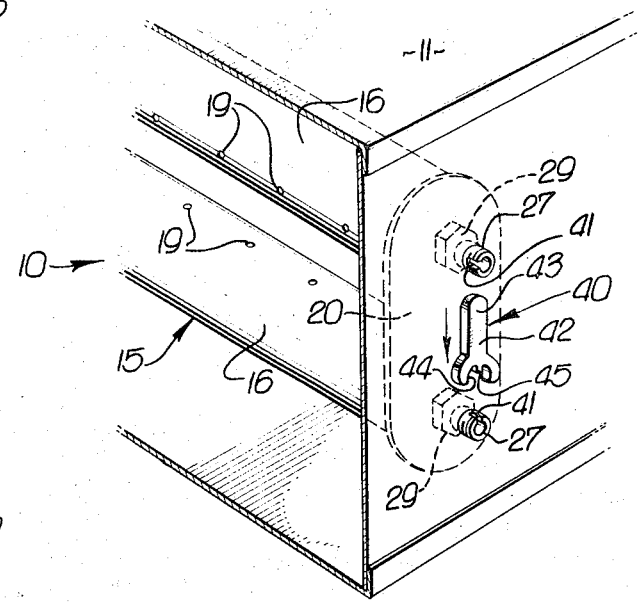
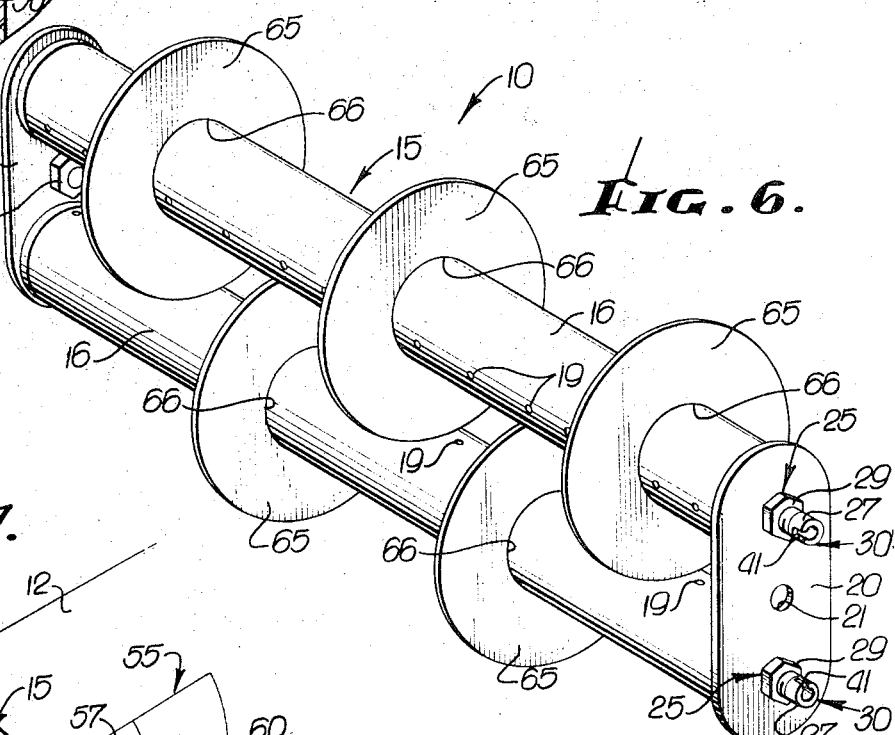
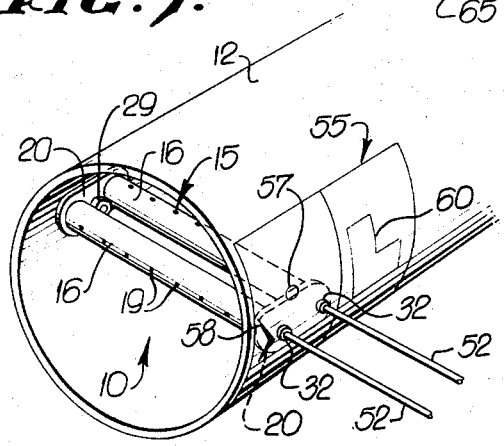

UNIVERSAL SENSING APPARATUS FOR SENSING VOLUMETRIC RATE OF FLUID FLOW

RELATED APPLICATIONS

This application is a continuation-in-part of my copending application Ser. No. 814,498 now abandoned filed Mar. 17, 1969, entitled "Apparatus For Sensing Volumetric Rate of Air Flow" and application Ser. No. 706,058 filed Feb. 16, 1968 entitled "Apparatus For Sensing Volumetric Rate of Air Flow" which is now abandoned in favor of sad application Ser. No. 814,498 now abandoned.

BACKGROUND OF THE INVENTION

This invention relates to fluid flow rate sensing apparatus, and more particularly to such apparatus for installation to a variety of fluid flow environments to sense the fluid flow.

This invention is an improvement on the invention as show in my copending application Ser. No. 814,498 now abandoned filed Mar. 17, 1969 and entitled "Apparatus for Sensing Volumetric Rate of Air Flow."

The apparatus of that invention was specially built into a particular air duct, and therefore suited for installation in that duct. The improved sensing apparatus of this invention utilizes the principal operation described in the prior copending application, but the construction of the apparatus according to this invention is such that the apparatus has greater versatility and adaptability.

The universal sensing apparatus of this invention may be installed in all types of fluid flow environments, in all sizes and shapes of ducts, to give not only one reading as to the volumetric rate of fluid flow, but also provide an independent reading to check the correctness of the initial reading. The universal sensing apparatus of this invention may be installed in round duct, rectangular duct, square duct, etc.; it may be installed in a duct passing along a wall or other obstacle; and it may be utilized to provide several different readings, all translatable into volumetric fluid flow, simply, quickly and accurately, to enable the technician on a job to provide an accurate and true figure for the volumetric rate of fluid flow when desired.

BRIEF DESCRIPTION OF THE INVENTION

Therefore, it is the primary object of this invention to provide a novel sensing apparatus of universal application for sensing the volumetric rate of fluid flow.

Other and additional objects of this invention are to provide such an apparatus which may be used in any fluid flow environment, to provide such an apparatus which may be used in any shape of duct, to provide such an apparatus which has a minimum number of parts, to provide such an apparatus which has a maximum number of parts which will be identical regardless of the size of the apparatus required for a particular installation, to provide such an apparatus which will provide several readings to act as a check on each other, to provide such an apparatus which can be installed easily in a duct, to provide such an apparatus which can be installed in a duct closely spaced along side a wall or other obstacle, to provide an apparatus which is easy to use, which is reliable in reading and which is easily checked for accuracy.

Other and further objects of this invention are to provide a method for using such an apparatus which quickly and simply provides for mounting the apparatus in a duct, to provide a method for properly locating the sensing openings of the apparatus with respect to the air flow to obtain the desired reading from the apparatus, to provide a method for taking a reading, relocating the openings, and taking another reading with the second reading checking the first reading; and to provide a method for using the apparatus which can be easily taught to workmen in the field, which is self-checking, and which may be made or repeated as needed to correct or change the air flow.

Generally stated, the universal sensing apparatus according to this invention, for sensing volumetric fluid flow, includes a pair of hollow tubular members, each having a series of axially spaced openings, spacer plates mounting the tubular members in spaced relationship, means for supporting the spacer plates and the tubular members carried thereby with the tubular members in the path of fluid flow, and means fluidly connecting the interior of said tubular members to a means for measuring differential fluid pressure. Each hollow tubular member may include a tube with end caps. The tubular members may be rotatably mounted to the spacer plates, may have means to indicate desired rotative positions, and may be rotated by a wrench to desired rotative positions. Each tubular member may have an end bushing with a central bore for fluidly connecting to a measuring means. The apparatus may have therewith a template with indicia for converting differential fluid pressure reading into volumetric fluid flow readings, and for indicating the location of mounting holes. The apparatus may be mounted in a square or round duct, with or across the flow of fluid.

Generally stated, the method according to this invention for using the universal sensing apparatus, includes the steps of locating holes of the tubular members with one set facing the fluid flow, and the other set facing other then towards the fluid flow, reading the instrument for measuring the differential fluid pressure, and converting the readings for differential fluid pressure using a correction factor, to volumetric air flow. The steps may additionally include the steps of turning a tubular member, reading the instruments, and converting the reading to volumetric air flow, and comparing this reading with a previous reading. The method, according to this invention for installing the universal sensing apparatus may include the steps of affixing a template to opposite duct walls, cutting holes where indicated by the template, locating the apparatus in the duct, and securing the apparatus in the duct. The locating step may include the steps of inserting the apparatus, spreading the walls of the duct, and sliding the bushings into the holes in the duct wall.

BRIEF DESCRIPTION OF THE DRAWINGS

FIG. 1 is a side elevational view of a rectangular air duct having mounted therein the universal sensing apparatus according to this invention, for sensing the volumetric rate of fluid flow in the duct;

FIG. 2 is perspective view of the universal sensing apparatus of FIG. 1;

FIG. 3 is an enlarged sectional view taken along the plane III—III of FIG. 1 showing the typical access end construction;

FIG. 4 is an enlarged sectional view taken along the plane III—III of FIG. 1 showing the typical blocked end construction;

FIG. 5 is an enlarged perspective view of FIG. 1 showing the sensing apparatus of FIG. 1 mounted in the rectangular air duct, with a wrench shown for rotating the tubes of the apparatus;

FIG. 6 is a view similar to FIG. 2 but showing the universal sensing apparatus with a rows of fins thereon; and FIG. 7 is a perspective view of a generally cylindrical air duct having the universal sensing apparatus mounted therein.

DETAILED DESCRIPTION OF THE PREFERRED EMBODIMENTS:

The universal sensing apparatus according to this invention for sensing volumetric rates of fluid flow is generally indicated by the numeral 10. The sensing apparatus 10 may be mounted to any shaped duct; a square duct 11 is shown in FIGS. 1 and 5, and a cylindrical duct 12 as shown in FIG. 7. The universal sensing apparatus 10 may be used to sense fluid flow in any fluid flow environment by the provision of suitable mounting means. The operation of the sensing apparatus 10 is explained in detail in my co-pending application Ser. No. 814,498 and that explanation is incorporated herein.

Generally the improvement in the sensing apparatus 10 with a pair of hollow tubular members 15, each having a series of axially spaced and aligned side openings 19 includes the provision of spacer plates 20 for spacing the tubular members 15, a member mounting means 25 for mounting the tubular members 15 to the spacer plates 20 to form a unit, a unit supporting means 30 for mounting the unit in a fluid stream and means 50 for fluidly connecting the interior of the hollow members 15 to a means (not shown) for measuring differential fluid pressure. The apparatus 10 may include holding means 35 for holding the tubular member 15 from rotating, means 40 for rotating the tubular members 15, and a template 55 for mounting on the side of a duct 11 or 12 to indicate the position at which mounting holes need to be cut, and to provide a chart for converting differential fluid pressure to volumetric fluid flow rate. Fins 65 may be provided on the hollow tubular members 15 for smoothing the flow of fluid adjacent the members 15.

Referring now to FIGS. 2, 3, and 4, the hollow tubular members 15 of the preferred embodiment are constructed of tubes 16 having open ends 17 on either end thereof. The length of the tubes 16 is determined by the inside dimension of the duct 11 or 12. The tubes 16 may be made of any suitable material which is light yet strong such as plastic, aluminum, steel, etc. As best seen in FIGS. 3 and 4, the open end 17 of the tubes 16 are closed by end caps 18 to provide a closed cylindrical plenum like chamber in the hollow tubular member 15. Each of the tubes 16 has a series of axially spaced in line side openings 19 therealong. The combined surface areas of these openings is much less than the cross-sectional area of the tube cavity so as to provide an air plenum or air pressure averaging feature.

The improvement according to this invention of the apparatus 10 includes the provision of spacer plates 20 for mounting the tubular members in spaced relationship. As best seen in FIG. 2, the spacer plates 20 are end plates of generally flat, elongated shape with rounded upper and lower ends. Each spacer end plate 20 contains three equally spaced holes 21 with the distance between the centerlines of the most distant holes being approximately 1 ½ times the outside diameter of the tubular member 15 to obtain the proper spacing of these member 15. The member mounting means 25 according to the improvement according to this invention is for mounting the tubular members 15 to the end plates 20. The mounting means 25 includes a threaded central bore 26 in each end cap 18, into which is received an externally threaded shoulder bushing 27. The shoulder bushing 27 has the large diameter threaded half extending outwardly from the end cap 18 through a hole 21 in the end plate to align the shoulder 28 with the outside surface of the end plate 20 and for threadably receiving on the small diameter half, a nut 29 tight against shoulder 28. The small diameter half of bushing 27 may be cut-off flush with the nut 29 to form a blocked end as shown in FIG. 4 or may protrude outwardly therefrom to form an access end as shown in FIG. 3. The shoulder 28 permits the nuts 29 to be tightened and yet permit the bushing 27 to be rotated, thereby rotating the tubular members 15 for proper positioning. Thus an assembled unit of tubular members 15 mounted to end plates 20 is completed, ready for supporting in a stream of fluid flow such as in a duct.

The unit of end plates 20 and the hollow tubular members 15 carried thereby, is supported by a unit supporting means 30. In the preferred embodiment, the supporting means 30 includes as best seen in FIGS. 1 and 5, spaced holes 31 cut in one side and a single hole 31 cut on the opposite wall of the duct 11 or 12. The protruding externally threaded bushings 27 extend through the spaced holes 31 as seen in FIG. 3 to receive a nut 32 therearound to secure the end plate 20 to the duct wall. On the opposite end plate 20 as seen in FIG. 4, an additional shoulder bushing 27 is provided extending through the central hole 21 and through the single hole 31 whereupon a nuts 32 are received thereon, to secure the other end plate 20 to the wall of the duct. The end plates 20 will be located adjacently inside the walls of the duct to present as little restriction as possible to the flow of fluid through the duct.

As the hollow tubular members 15 are rotatbly mounted to the end plates 20, by the shoulder bushing 27, holding means 35 may be provided for holding the hollow tubular members 15 in selected rotative positions relative the end plates 20. In the preferred embodiment as seen in FIGS. 3 and 4, the holding means 35 includes dimples 36 formed in the outer surface of the end caps 18. Mating dimples 37 are formed on a spring washer 38 which is staked to the end plates 20 around the outer two holes 21. It is contemplated that four equally circumferentially spaced dimples 36 and mating dimples 37 will be sufficient with two of the mating dimples being aligned along with the flow of fluid and remaining two dimples being across the flow of fluid. The cooperation of the dimples 36 and mating dimples 37 will hold the hollow tubular members 15 from rotating and will additionally indicate the location of four equally spaced rotational positions of the hollow tubular members 15 for use during rotation of the members 15.

The apparatus 10 may be provided with means 40 for rotating the hollow tubular members 15. In the preferred embodiment, the means 40 includes slots 41 cut in the protruding ends of the threaded bushings 27. It should be noted in FIGS. 2 and 5 that the location of the slot 41 corresponds to the location of the axially spaced in line openings 19, so that by observing the direction of a slot 41 the direction the openings 19 are facing can be ascertained.

As best seen in FIG. 5, a wrench 42 with a handle 43 and a recess 44 containing a protruding tab 45 is provided for rotating the hollow tubular members 15. The wrench 42 will slide over an individual externally threaded bushing with the tab 45 extending into the slot 41 thereof. The handle may then manually be rotated to a desired position rotating the bushing 27 and the hollow tubular members 15 in the end plates 20 and walls of the duct. During such rotation, the mating dimples 37 of the spring washers are forced from the dimples 36 to mate with the next dimple 36 in turn, as rotation occurs to sense the four primary rotating positions of the hollow tubular members and hold the hollow tubular members 15 in one of these positions until overcome by a rotating force such as is applied by wrench 42.

The apparatus 10 according to this invention also contains means 50 fluidly connecting the interior of the hollow tubular members 15 to a differential fluid pressure measuring device or instrument (not shown). In the preferred embodiment, the means 50 includes a central bore 51 in each of the protruding bushings 27 extending through the spaced holes 31 in the one side of the duct. As best seen in FIG. 3, a flexible hose 52 may be inserted into the central bore 51 to fluidly connect each hollow tubular member 15 with a differential fluid pressure measuring instrument (not shown). The differential fluid pressure measuring instrument could be any one of several different varieties of flow meter heads ranging in sophistication from a simple monometer, or magna helic to the most sophisticated electronic transducers, which could be used to control flow directly. These instruments will provide a reading of differential fluid pressure that occurs between the hollow tubular members 15, due to the different orientation of the openings 19 of different members 15 to give a reading for the difference between static pressure and total pressure of the fluid in the duct which indicates velocity pressure.

The universal sensing apparatus 10 may be provided with a template means indicated at 55 for locating the position of holes 31 and for providing needed information to convert differential fluid pressure into volumetric flow rate. A sample of such template means is shown in FIG. 1 and includes indicia 56 having two pairs of spaced holes 57, one pair vertically aligned and the other pair horizontally aligned for either vertical or horizontal mounting of the apparatus 10. The indicia 56 also includes an arrow 58 indicating the direction from which the fluid flow is coming. A space 59 is provided for insertion of a correction factor for the particular type of apparatus 10 installed. the indicia 56 will also include a chart 60 for converting the differential fluid pressure reading into volumetric flow rate without the use of complicated mathematical formulas. It is contemplated that the template 55 woulld be in the form of a decal or of a printed metal foil having adhesive on the back which will readily stick to the sides of the duct. The template 55 can be used with a square duct 11 as seen in FIG. 1 or with a cylindrical duct 12 as seen in FIG. 7.

The universal sensing apparatus 10 will be supplied preassembled in a unit as shown in FIG. 2. The apparatus 10 will be supplied in the proper length for the size and shape of the duct 11 or 12 to which it is to be installed. However, should the length supplied be too long, it would be a simple matter to disassemble one end of the hollow tubular members, cut the ends of the tubes 16 off, and reassemble. With each unit will be supplied a template 55, and a wrench 42.

The method for mounting the apparatus 10 in a particular duct such as a square duct 11 or cylindrical duct 12 involves locating the center line of the duct and sticking the template 55 to the side wall of the duct along the center line as shown in FIG. 1 for a square duct 11, or as shown in FIG. 7 for a round duct 12. When the template 55 is properly positioned, the spaced holes 57 indicate the proper location for cutting the holes 31. On the opposite wall of the duct and vertically aligned with the first pair of holes, a single hole 31 is cut through the duct wall at the center line thereof. The unit of end plates 20 and the hollow tubular members 15 mounted thereto by mounting means 25, is inserted through the nearest end of the duct until the protruding end of the bushings 27 are aligned with the holes 31 whereupon the pair bushings 27 are pushed therethrough and the opposite bushing 27 is pushed into alignment with the single hole 31, bowing out the sides of the duct until the single bushing 27 extends through the single hole 31. The nuts 32 are threaded to the bushing 27 and tightened to finger tight to properly position and hold the apparatus 10 in the duct 11 or 12.

The hollow tubular members 15 may now be rotated by wrench 42, if needed, until one of the hollow tubular members 15 has the openings 19 facing the direction of flow (the handle of the wrench will point in the direction the openings face, i.e., towards the direction of the flow) and the other tubular member 15 has its openings 19 facing across to the direction of fluid flow (the handle of wrench 42 will also likewise point across the directon of fluid flow) as is shown in FIG. 5. The same wrench 42 will rotate both tubes by sliding the wrench first on one bushing 27 with the tab 45 in the slot 41 and moving the handle until the handle points the desired way, removing the wrench and repeating the procedure with the other bushing 27. The nuts 32 may mow be tightened and the flexible hoses 52 inserted into the central bores 51 to fluidly connect the hollow tubular members to the means for measuring differential fluid pressure.

The side openings 19 in the one member 15, facing the flow of fluid will provide the total pressure which is averaged in one cylindrical plenum like chamber and the side openings 19 in the other member 15 will provide the static pressure which is average in other cylindrical plenum like chamber with the measuring means giving a reading of the difference in these pressures which includes velocity pressure. The reading for differential fluid pressure obtained from the means for measuring differential fluid pressure is multipled by the correction factor supplied with the apparatus 10, and is correlated with the dimensions of the duct on the chart 60 to give the volumetric rate of fluid flow past the apparatus 10 in the duct.

As an additional check on the accuracy of the rate of the fluid flow the nuts 32 can be loosened, and the wrench 42 used to rotate the bushings 27 positions such as with the openings 19 of the one tubular member 15 facing across the flow of fluid, and the openings of the other tubular member 15 facing the fluid flow. The measuring means can be reconnected and another reading taken which using the correction factor and the dimensions of the duct can be translated by chart 60 into independent rate of fluid flow, which should be the same as the initial rate. If third or fourth checks are required, the hollow tubular members 15 could be rotated similarly to various other positions such, as for example, the openings 19 for one member 15 facing into the direction of flow of fluid, and the opening of the other member facing away from the flow of fluid to give another differential fluid pressure which upon use of proper correction factors and dimensions would give a third rate of fluid flow which should correspond with the other rates. This technique provides several checks on the accuracy of the initial reading and yet is simple and easy to perform in the field.

After the desired readings have been taken, the flexible hoses 52 are withdrawn from the central bores 51 of the external threaded bushings 27 and plugs (not shown) inserted into the central bores 51 to close the bore 51 until further readings are needed. The apparatus 10 will remain in the duct until further readings are needed for determining the volumetric rate of fluid flow, i.e., for rebalancing the fluid system carried by the duct.

It may be necessary to know the volumetric flow rate right adjacent intersections or branches in the duct. At such intersections or branches, the fluid flow is turbulent and such turbulence will reduce the accuracy of readings taken there. To facilitate the taking of volumetric air flow rate readings near intersections or branches in the duct, circular fins 65 are provided for straightening the fluid flow past the hollow tubular members 15. In the preferred embodiment, the fins 65 are generally flat annular discs, having holes 66 of a diameter slightly smaller than the outside diameter of the hollow tubular members 15. The fins 65 are slid onto the hollow tubular members and axially spaced to locate between adjacent openings, for example between every other opening 19 as shown in FIG. 6, to locally smooth the flow of fluid over the members 15.

FIG. 7 shows the unit of tubular members 15 and end plates 20 mounted in a cylindrical duct 12. Because of the shape of the duct 12, the spacing of the hollow tubular members 15 is located with the flow of fluid rather than being across as in the square duct 11. The method of taking readings with the apparatus 10 in a cylindrical duct 12 is exactly the same as before, except that the rear hollow tubular member 15 can never have it openings 19 facing the fluid flow, and so the openings 19 of the forward hollow tubular member 15 must face the fluid flow.

Thus the universal sensing apparatus 10 of this invention is a novel apparatus of universal application for sensing the volumetric rate of fluid flow.

I claim:

1. In an apparatus for sensing the volumetric rate of fluid flow, including a pair of hollow tubular members, each having side openings, and means for measuring differential pressure, the improvement comprising the provision of:

spacer plates for mounting the tubular members in spaced relationship;

member mounting means for mounting the tubular members to the spacer plates to form an assembled unit, unit supporting means for supporting said tubular members in the path of fluid flow, said member being so supported that one member senses one fluid pressure, and the other member senses another fluid pressure, means for fluidly connecting the interior of said hollow tubular members to the means for measuring differential pressure to measure the difference in the fluid pressure and to provide an indication of the differential pressure which may be converted to volumetric rates of fluid flow, and circular fins around the tubular members and axially spaced therealong to locally smooth the flow of fluid thereacross, wherein the circular fins are annular disks with a central hole having an inside diameter slightly less than the outside diameter of the tubular members for being slid thereover and held axially spaced by the engagement therebetween.

2. In an apparatus for sensing the volumetric rate of fluid flow in a hollow duct having walls, said apparatus including a pair of hollow tubular members of a length to fit between the walls and to extend across the duct, each member having side openings and means for measuring differential fluid pressure, the improvement comprising the provision of:

end plates for mounting the tubular members in spaced relationship;

member mounting means for mounting the tubular members to the end plates to form an assembled unit, wherein the member mounting means rotatably mounts the members for rotation relative the end plates;

unit supporting means for mounting the unit in the duct with the hollow tubular members extending thereacross and with the end plates located adjacent to associated duct walls, wherein the unit supporting means rotatably mounts the members for rotation relative the walls of the duct;

means for fluidly connecting the interior of said hollow tubular members through the duct walls to the means for measuring differential fluid pressure so as to provide an indication of differential fluid pressure which may be converted to volumetric rate of fluid flow; and holding means for selectively holding the members from rotating, said members being rotatable against said holding means to provide different orientations of the openings with respect to the flow of fluid for checking the volumetric flow rate.

3. In an apparatus for sensing the volumetric rate of fluid flow, including a pair of hollow tubular members, each having side openings, and means for measuring differential pressure, the improvement comprising the provision of:

spacer plates for mounting the tubular members in spaced relationship;

member mounting means for mounting the tubular members to the spacer plates to form an assembled unit;

unit supporting means for supporting said tubular members in the path of fluid flow, said members being so supported that one member senses one fluid pressure and the other member senses another fluid pressure;

means for fluidly connecting the interior of said hollow tubular members to the means for measuring differential pressure to measure the difference in the fluid pressures and to provide an indication of the differential pressure which may be converted to volumetric rate of fluid flow wherein the member mounting means rotatably mounts the tubular members to the spacer plates; and holding means are provided for holding the tubular members in selected rotative positions relative the spacer plates, wherein the holding means includes dimples in the end caps, and spring washers located on the spacer plates, said spring washers having mating dimples for mating with the end cap dimples in selected rotative positions of the tubular members.

4. In a method of determining volumetric rate of fluid flow using a pair of substantially identical hollow tubular members having side openings therein, said tubular members extending across the flow of fluid and being fluidly connected to a means for measuring differential fluid pressure, including the steps of:

locating the openings of one tubular member to face the flow of fluid;

locating the openings of the other tubular member to face other than toward the flow of fluid;

reading the means for measuring differential fluid pressure to provide an indication of the differential fluid pressure between the members; and converting the indication of the differential fluid pressure to volumetric flow rate, the improvement comprising the steps of:

repositioning the tubular members to locate the openings of said one tubular member to face other than towards the flow of fluid and the openings of said other tubular member to face the flow of fluid;

reading the means for measuring differential fluid pressure to determine volumetric rate of air flow; and comparing the two volumetric rates.

5. The method as in claim 4 wherein the tubes are rotatably mounted and the step of repositioning the tubular members includes rotating the tubular members, and thereafter holding the tubular members when so repositioned.

6. The method as in claim 5 wherein each tubular member is non-rotatable connected to a bushing which is otherwise rotatable and wherein the step of rotating the tubular members includes the steps of rotating a first bushing of said bushings and the tubular member connected thereto, to the desired position and then rotating a second bushing of said bushings and the tubular member connected thereto to the desired position.

7. In an apparatus for sensing the volumetric rate of fluid flow, including a pair of hollow tubular members, each having side openings, and means for measuring differential pressure, the improvement comprising the provision of:

spacer plates for mounting the tubular members in spaced relationship;

member mounting means for mounting the tubular members to the spacer plates to form an assembled unit, wherein the member mounting means includes a protruding bushing, and wherein the fluid flow is confined by walls, said walls having holes therethrough for receiving therethrough one end of the bushing;

unit supporting means for supporting said tubular members in the path of fluid flow, said members being so supported that one member senses one fluid pressure and the other member senses another fluid pressure; and means for fluidly connecting the interior of said hollow tubular members to the means for measuring differential pressure to measure the difference in the fluid pressures and to provide an indication of the differential pressure which may be converted to volumetric rate of fluid flow, wherein a bushing is provided for each tubular member, and wherein the means for fluidly connecting the interior of the members to a means for measuring differential fluid pressure includes a central bore in each bushing.

8. The apparatus as in claim 7 wherein at least one bushing is non-rotatably attached to its respective tubular member, and is rotatably mounted in the spacer plates, and in the walls;

whereby rotation of the one bushing rotates the respective tubular member.

9. The apparatus as in claim 8 wherein each one bushing is provided with a wrench attaching means, or receiving a wrench thereon, rotation of the wrench, when received thereon, rotating the bushing and its respective tubular member.

10. The apparatus as in claim 7 wherein a template is provided on the wall for locating the holes for the bushings.

11. The apparatus as in claim 10 wherein the template also includes indicia for converting differential fluid pressure into volumetric rate of fluid flow.

* * * * *